324-77. SR
4-30-74 XR 3,808,412

United States Patent [19] [11] 3,808,412
Smith [45] Apr. 30, 1974

[54] FFT FILTER BANK FOR SIMULTANEOUS SEPARATION AND DEMODULATION OF MULTIPLEXED SIGNALS

[75] Inventor: Richard Allan Smith, Morristown, N.J.

[73] Assignee: Bell Telephone Laboratories, Incorporated, Murray Hill, N.J.

[22] Filed: Dec. 27, 1971

[21] Appl. No.: 212,543

[52] U.S. Cl. ............ 235/152, 179/15 BC, 324/77 B
[51] Int. Cl. ............ G06f 15/34, H04j 1/00
[58] Field of Search ........ 235/152, 156; 179/15 BC, 179/15 FD, 15 FS; 324/77 B, 77 G

[56] References Cited

UNITED STATES PATENTS 3,544,894 12/1970 Hartwell et al. .................. 324/77
3,605,019 9/1971 Cutter .................. 179/15 FD

OTHER PUBLICATIONS

A. V. Oppenheim, Speech Spectrograms Using the FFT, IEEE Spectrum, Aug. 1970, pp. 57–62.

*Primary Examiner*—Malcolm A. Morrison
*Assistant Examiner*—David H. Malzahn
*Attorney, Agent, or Firm*—W. Ryan

[57] ABSTRACT

Methods and apparatus for performing the simultaneous channel separation and demodulation of frequency multiplexed channels are disclosed. Fast Fourier transform processing is used to perform these operations on both double sideband and single sideband multiplexed signals.

9 Claims, 8 Drawing Figures

FFT FILTER BANK FOR SIMULTANEOUS SEPARATION AND DEMODULATION OF MULTIPLEXED SIGNALS

GOVERNMENT CONTRACT

The invention herein claimed was made in the course of or under a contract with the Department of the Navy.

BACKGROUND OF THE INVENTION

This invention relates to communication systems. More particularly, the present invention relates to methods and apparatus for effecting channel separation and demodulation in frequency multiplexed communication systems. Still more particularly, the present invention relates to fast Fourier transform processes and processors for performing simultaneous channel separation and demodulation of frequency multiplexed signals.

DESCRIPTION OF THE PRIOR ART

The use of frequency multiplexing in communication systems is well known. Much of present long haul telephony depends to a great extent on the use of microwave and cable systems for transmitting and receiving wideband signals. These wideband signals are in many cases advantageously representative of a large number of frequency multiplexed channels. A useful tutorial description of the use of such multiplexing is presented in *Transmission Systems for Communication* published by Bell Telephone Laboratories, Incorporated, 1964.

Because of the use of frequency multiplexed technology with favorable results, and because of the continuing need for increased channel capacity, there has been a corresponding continuing development of the frequency multiplexing arts. An important element in any frequency multiplex system is that used to separate wideband signals into component channel signals. In the prior art it has been common to use a (usually large) number of individual filters associated with the respective output channels. Accordingly, there have been developed so-called channel bank filters for providing the desired separation function. A useful background paper which cites many of the important developments in the channel bank field, as well as detailing one particular system is Blecker et al, "The Transistorized A5 Channel Bank for Broadband Systems," BSTJ, vol. XLI, Jan. 1962, pp. 321–360.

Since the separation of a plurality of multiplexed channel signals necessarily involves the use of frequency-determining apparatus, many techniques and apparatus configurations from related frequency analysis fields have been applied to solving the problem of channel separation. An important development in the filtering arts related to these problems is described in U. S. Pat. No. 3,021,478 issued Feb. 13, 1962 to L. A. Meacham.

Recent developments known collectively as fast Fourier transform (FFT) techniques have proven to be of great value in the signal processing arts. A variety of algorithmic extensions of the FFT have been presented in the published literature since the basic computational procedure was described in Cooley and Tukey, "An Algorithm for the Machine Calculation of Complex Fourier Series," Mathematics of Computation, April 1965, pp. 297–301. A recent summary of several of the most popular apparatus configurations for practicing the FFT is, for example, "Fast Fourier Transform Hardware Implementations" by G. D. Bergland, *IEEE Trans. on Audio and Electroacoustics*, Vol. AU–17, June 1969, pp. 104–108. Another useful reference is Cochran et al, "What Is the Fast Four Transform," *IEEE Trans. Audio and Electroacoustics*, June 1967, pp. 45–55. One particular form of fast Fourier transformer apparatus which has been found to be of commercial importance is the so-called cascade or pipeline processor, described, for example, in Bergland and Hale, "Digital Real-Time Spectral Analysis," *IEEE Trans. Electronic Computers*, Vol. EC– 16, pp. 180–185, April 1967, and in U. S. Pats. No. 3,544,775 issued Dec. 1, 1970 to G. D. Bergland et al, and No. 3,588,460 issued June 28, 1971 to R. A. Smith. A typical "sequential" FFT processor is described in U. S. Pat. No. 3,517,173 issued June 23, 1970 to M. J. Gilmartin, Jr., et al.

The applicability of fast Fourier transforms to a communication context has been recognized previously. An early paper citing applicability of FFT techniques to filtering operations was Stockham, "High Speed Convolution and Correlation", *Proc. AFIPS* 1966 *Spring Joint Computer Conference*, vol. 28, Washington, D. C., Spartan, 1966, pp. 229–233. Other applications of FFT technology to filtering and other communications applications have included Helms, "Fast Fourier Transform Method of Computing Difference Equations and Simulating Filters," *IEEE Trans. Audio and Electroacoustics*, Vol. AU–15, June 1967, pp. 85–90 and Helms, "Non-Recursive Digital Filters: Design Methods for Achieving Specifications on Frequency Response", *IEEE Trans. Audio and Electroacoustics*, Vol. AU–16, September 1968, pp. 336–342. Still other applications of FFT technology to a communication context are described in Ferguson, "Communication at Low Data Rates—Spectral Analysis Receivers," *IEEE Trans. on Comm. Tech.*, Vol. COM–16 October 1968, pp. 657–668. Another related application of FFT technology is that described in Rife et al, "Use of the Discrete Fourier Transformer in the Measurement of Frequencies and Levels of Tones," *BSTJ* vol. 49, Feb. 1970, pp. 197–228.

It is clear from the prior art cited above that FFT techniques are useful for performing a wide variety of communications-related functions. It is therefore an object of the present invention to provide a system for separating a plurality of frequency multiplexed signals using fast Fourier transform techniques. It is a further object of the present invention to provide fast Fourier transform apparatus and methods for effecting the frequency demodulation of a plurality of frequency multiplexed signals. It is therefore an overall object of the instant invention to modify, extend and adapt prior art FFT methods and apparatus to effect the functions required in realizing the above-mentioned separation and demodulation.

SUMMARY OF THE INVENTION

Briefly stated, in accordance with one embodiment of the instant invention, there are provided means for sampling an input broadband signal containing a number of component channels, each bearing a separate and, in general, indepdendent informational content. These continuous signals, upon being sampled and converted to an appropriate digital format, are stored in a memory for subsequent processing. The processing of stored double-sideband signals to achieve the desired channel separation and demodulation advantageously involves the multiplication by an appropriate weighting factor and the subsequent analysis of the resulting products using standard FFT processing. By suitably altering the weighting factors and performing a further multiplication, it is possible to similarly process single sideband signals with corresponding relative ease.

BRIEF DESCRIPTION OF THE DRAWING

The above-summarized embodiment of the instant invention and its various features will be seen to achieve the desired objects upon a consideration of the detailed description below taken in connection with the accompanying drawing wherein.

DETAILED DESCRIPTION

Theoretical Considerations

Figures 1, 1A, 1B, 1C:
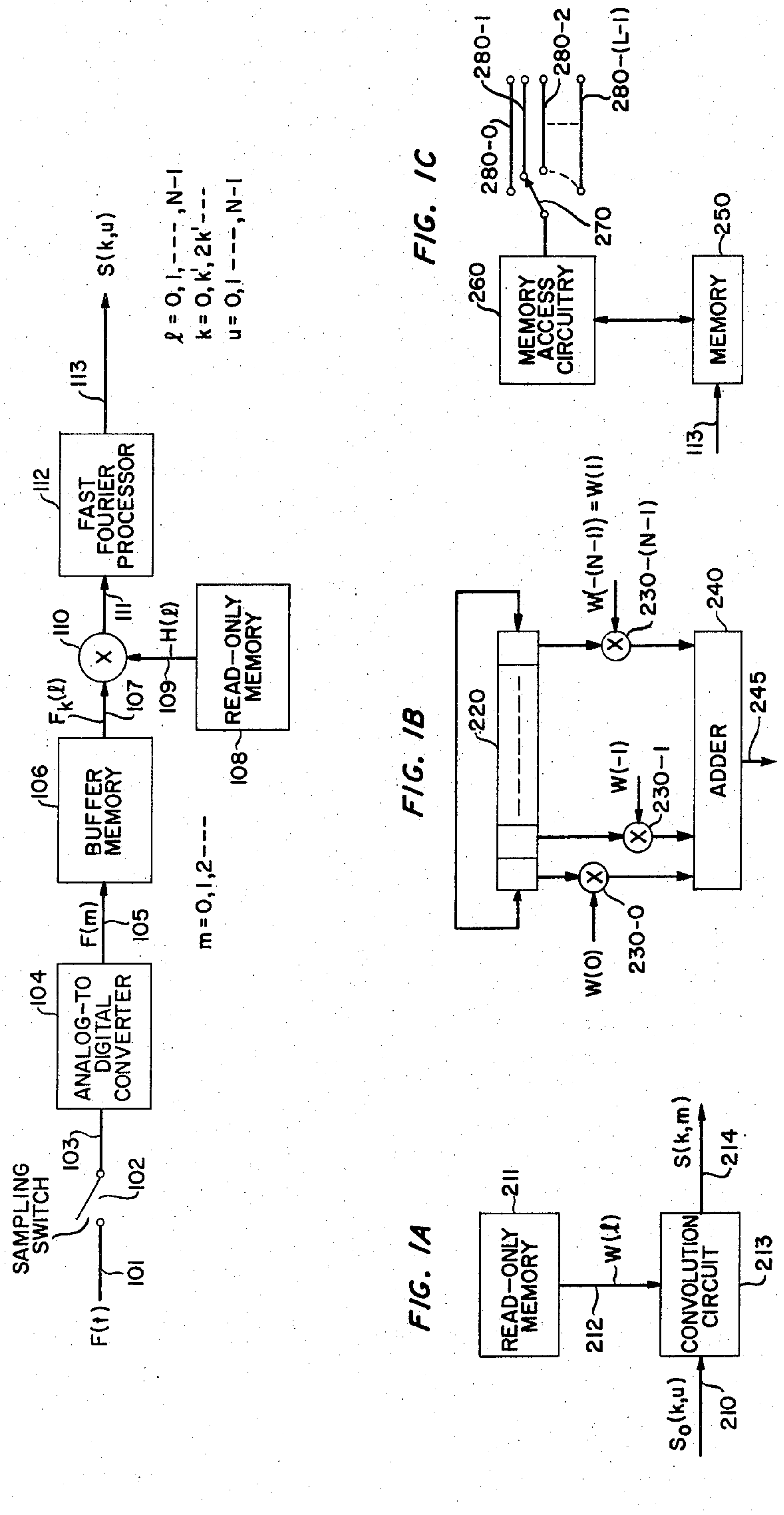
FIG. 1 shows the overall organization of an FET-based processor for performing simultaneous demodulation and separation of a frequency multiplexed signal.
FIG. 1A illustrates a variation to the system of FIG. 1 for processing in the frequency domain.
FIG. 1B is a more detailed arrangement for performing the operations of the circuit of FIG. 1A for the case where $u$ is an integer.
FIG. 1C illustrates an output buffer memory and distribution circuit for use with the system of FIG. 1.

To supply a uniform notation and to simplify the detailed description of an illustrative embodiment of the present invention there will first be presented a summary of theoretical and data processing considerations relating to the Fourier transform. It should be noted initially that the FET is a computationally less complex technique for computing the discrete Fourier transform (DFT) described, for example, in Blackman and Tukey, *The Measurement of Power Spectra*, Dover, New York, 1959. Accordingly, the salient features of the DFT will be introduced first. Another reference that may facilitate an understanding of the DFT and its relationship to the FFT is the Cochran et al paper, supra. This section will also introduce some basic relationships pertaining to the channel separation features of the instant invention.

The discrete Fourier transform (DFT) of a sequence $\{A(k)\}_{k=0}^{N-1}$ of complex numbers is the function X whose value for any real argument $u$ is given by $$X(u) = \sum_{k=0}^{N-1} A(k)e^{-i2\Pi uk/N}. \quad (1)$$

X is thus the sum of N periodic functions of period N, and, therefore, itself has period N, i.e., for any real $u$ $$X(u+N) = X(u).$$

Given the DFT X of the sequence $\{A(k)\}_{k=0}^{N-1}$, one can recover the original sequence by using only the sequence $\{X(m)\}_{m=0}^{N-1}$. This "inverse" formula is $$A(k) = N^{-1} \sum_{m=0}^{N-1} X(m)e^{+i2\Pi mk/N}, \quad (2)$$

for $k=0,1,\ldots,N-1$.

The concept of convolution is well known in the signal processing arts. Some useful relationships involving the convolution of two sequences will now be presented.

Let X be the DFT of $\{A(k)\}_{k=0}^{N-1}$ and let Y be the DFT of the sequence $\{B(k)\}_{k=0}^{N-1}$. Let $\{B(k)\}_{k=-\infty}^{\infty}$ be a periodic sequence with period N. Then the following formulas hold:

$$\sum_{k=0}^{N-1} A(k)B(k)e^{-i2\Pi uk/N} = N^{-1} \sum_{m=0}^{N-1} X(m)Y(u-m). \quad (3)$$

$$\sum_{l=0}^{N-1} A(l)B(k-l) = N^{-1} \sum_{m=0}^{N-1} X(m)Y(m)e^{i2\Pi mk/N}. \quad (4)$$

A generalized version of Parseval's formula for DFT's may be stated as follows:

$$\sum_{k=0}^{N-1} A(k)\bar{B}(k) = N^{-1} \sum_{m=0}^{N-1} X(m)\bar{Y}(m) \quad (5)$$

where, as usual, X and Y are the DFT's of $\{A(k)\}_{k=0}^{N-1}$ and $\{B(k)\}_{k=0}^{N-1}$, respectively, and where $^{-}$ denotes complex conjugation.

This formula follows directly from Eq. (3) upon observing that Y, the DFT of $\{\bar{B}(k)\}_{k=0}^{N-1}$, satisfies $$\hat{Y}(u) = \bar{Y}(-u). \quad (6)$$

When the input sequence $\{A(k)\}_{k=0}^{N-1}$ consists entirely of real numbers, its transform X will have the symmetry property $$X(u) = \bar{X}(-u) = \bar{X}(N-u). \quad (7)$$

The symmetry property permits one to separate the transforms of two real input sequences $\{A(k)\}_{k=0}^{N-1}$ and $\{B(k)\}_{k=0}^{N-1}$ when they have been transformed simultaneously as one complex sequence $\{C(k) = A(k) + iB(k)\}_{k=0}^{N-1}$. Let X, Y and Z denote the DFT's of A, B and C respectively. Then one may perform the separation according to the formulas $$X(u) = [Z(u) + \bar{Z}(N-u)]/2 \quad (8)$$

$$Y(u) = [Z(u) - \bar{Z}(N-u)]/2i \quad (9)$$

The basic utility of Fourier transform techniques for purposes of implementing the instant invention is through their relationship to the field of digital filtering. For present purposes, a digital filter may be defined by the input-output relation $$B(k) = \sum_{l=-\infty}^{\infty} A(l)H(k-l) = \sum_{l=-\infty}^{\infty} A(k-l)H(l) \quad (10)$$

where $\{B(k)\}_{k=-\infty}^{\infty}$ is the output sequence and $\{A(k)\}_{k=-\infty}^{\infty}$ is the input sequence. If the unit response $\{H(k)\}_{k=-\infty}^{\infty}$ is zero for all negative indices, i.e., $H(k) = 0$ for $k = -1, -2, \ldots$, then the digital filter is said to be causal. If the unit response is non-zero only for a finite number of indices, then the digital filter is said to be finite.

Digital filters which are both finite and causal have an immediate connection with the discrete Fourier transform. To point out this connection, suppose that the unit response $\{H(k)\}_{k=-\infty}^{\infty}$ is zero for all indices from N on, and let the input sequence be $\{\exp(i2\pi\nu k N\}_{k=-\infty}^{\infty}$. With this input, the output sequence is merely the input sequence with each value multiplied by the DFT of the unit response evaluated at $\nu$. To prove this, merely observe that $$\sum_{l=0}^{N-1} H(l)e^{i2\Pi\nu(k-l)/N} = e^{i2\Pi\nu k/N} \cdot \sum_{l=0}^{N-1} H(l)e^{-i2\Pi\nu l/N}, \quad (11)$$

which is the desired result. Because of this result, the DFT of the unit response of a finite causal digital filter will be referred to as the filter's *frequency response*.

Next, consider the function S defined by $$S(k, u) = \sum_{l=0}^{N-1} G(-l+N-1)F(l+k-N+1)e^{-i2\Pi ul/N}. \quad (12)$$

For fixed k, S is the DFT of the sequence $\{G(-l+N-1)F(\{l+k-N+1)\}_{l=0}^{N-1}$. For fixed $u$, S is the output of a causal finite digital filter having unit response (nontrivial portion) $\{G(k)\exp(i2\pi u(k-N+1)/N)\}_{k=0}^{N-1}$. This may be verified by changing the summation variable from $l$ to $l' = -l + N - 1$ so that, omitting the prime, one obtains the equivalent expression $$S(k, u) = \sum_{l=0}^{N-1} F(k-l)G(l)e^{i2\Pi u(l-N+1)/N}. \quad (13)$$

Knowing the unit response for fixed u, one then obtains the corresponding frequency response R(v) as $$R(\nu) = e^{-i2\Pi\nu(N-1)/N}W(u-\nu) \quad (14)$$

where W is the DFT of the weight sequence $\{G(-1+N-1)\}_{l=0}^{N-1}$. Therefore, except for a trivial phase factor, the frequency response is a shifted reversed version of the DFT of the weight sequence, shifted $u$ units to the right along the $\nu$-axis. Thus if the weight sequence determines a "low-pass" frequency response for $u = 0$, then for other values of $u$, a one-sided "bandpass" response will result with $u$ determining the "center frequency". By picking a discrete set of values of $u$ and computing $S(k,u)$ for each of these values of $u$, one obtains the output of every filter of a bank of digital filters. In other wrods, a filter-bank spectrum analyzer has been realized through the use of a discrete Fourier transform method. This method will, therefore, be referred to as *discrete Fourier transform spectrum analysis.*

It is clear that $H(l)$ supplies a shaping function often referred to as a "time window." There is, of course, a corresponding "frequency window" which is represented above by $W(\nu)$. The choice of weighting functions or windows is a standard step in signal processing technology and is discussed, for example, in Helms, "Nonrecursive Digital Filters: Design Methods for Achieving Specifications on Frequency Response," *IEEE Trans. on Audio and Electroacoustics*, Vol. AU-16, Sept. 1968, pp. 336–342; the Blackman and Tukey reference, supra; and in U.S. Pat. No. 3,544,894 issued Dec. 1, 1970 to W. T. Hartwell and R. A. Smith. Particular windows having desirable properties will be treated below.

Filter Bank Apparatus

With the above theoretical considerations as background, a description will now be presented of appropriate apparatus configurations for carrying out various of the computational procedures involved in performing the separation of a wideband signal into component channels. It will then be shown how this apparatus may be adapted to effect the simultaneous demodulation of the constituent channel signals.

Figure 2:
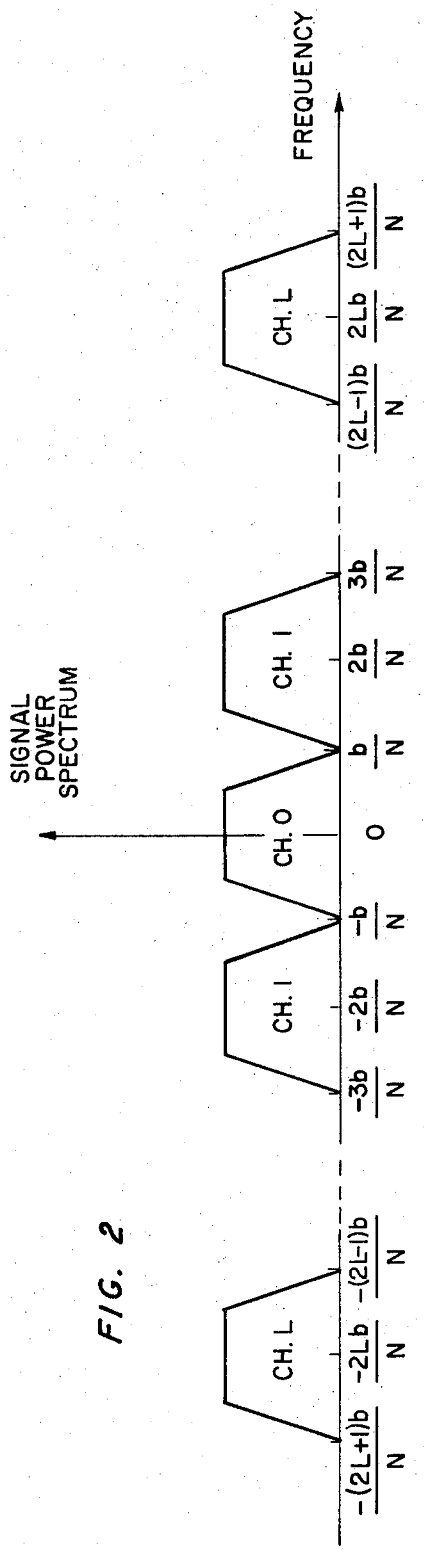
FIG. 2 shows the general frequency content of an input multiplex signal for the system of FIG. 1.

To be specific, it will be assumed that $F(t)$ is a time function having a power spectrum of the form shown in FIG. 2, and which time function is sampled at the instants $t = 0, \pm1, \pm2, \ldots$ $F(t)$ will thus be assumed to be a wideband signal (with bandwidth $(2L+1)b/N$) comprising L component channels each including a double-sideband modulated carrier signal. Further, it will be assumed that each of the channel carrier signal frequencies is an integer multiple of the sampling frequency and that these carrier signals are in-phase with each other and with the sampler. Time is measured in an arbitrary unit; hence frequency is measured in the reciprocal of that unit. The function $S(k,u)$ is then formed, using the apparatus of FIG. 1, according to $$S(k, u) = \sum_{l=0}^{N-1} H(l)F_k(l)e^{-i2\Pi ul/N} \quad (15)$$

where N is a positive integer, $k$ is an arbitrary integer, and $F_k(l)$ is the segment of $F(t)$ lying between the limits $t=k-N+1$ and $t=k$, inclusive of the end points, i.e., $$F_k(l) = F(l+k-N+1) \quad (16)$$

for the range $l=0,1,\ldots,N-1$.

$H(l)$ is a fixed weight function chosen to give the desired filter frequency response for the filter bank. This frequency response, for any filter of the bank, is the same in amplitude as a reversed shifted version of the response $$W(\nu) = \sum_{l=0}^{N-1} H(l)e^{-i2\Pi\nu l/N}. \quad (17)$$

By frequency response is meant a function $R(\nu)$ such that an input of the form $\exp(i2\pi\nu t/N)$ sampled at $t=0,\pm1,\pm2,\ldots$ gives as output the same samples multiplied by R(v). More specifically, $S(k,u)$ is the output at time $k$ of a digital filter with frequency response $$R(v) = e^{-i2\Pi v(N-1)/N} \cdot W(u-v). \quad (18)$$

The parameter u varies the position of the filter on the frequency axis. Notice that while R is given as a function of $v$, it is really $v/N$ which is the frequency. A similar remark applies to $u$ and $u/N$. Using these variables rather than the true frequency variables has the advantage of making the integer values of these variables correspond to frequencies which are integer multiples of the reciprocal of the record length N which is used in the processing. These frequencies are the ones which are conventional for Fourier series, and are the frequencies at which the fast Fourier transform algorithms evaluate the discrete Fourier transform.

The above-mentioned sampling is performed by standard sampling apparatus indicated in FIG. 1 by sampling switch 102. The input signal $F(t)$ appears on input lead 101. The sampled output appears on lead 103. This sampled output is then applied to an analog-to-digital converter 104 which produces a sequence of digital number representations for each sample of the input signal $F(t)$. The converter 104 is also of standard design and produces its output, $F(m)$, on lead 105. It proves useful to accumulate a sequence of N of the signals $F(m)$ to facilitate further processing. For this purpose a buffer memory 106 is conveniently provided. This memory may also be of standard design. A sequence of N consecutive digital signals corresponding to $F(t)$, when read from memory 106 constitute the above-mentioned sequence $F_k(l)$.

The product $H(l)F_k(l)$ is then formed by multiplier 110 based on corresponding values of $F_k(l)$ and $H(l)$ read from buffer memory 106 and a read-only memory 108, respectively. Both memory 108 and multiplier 110 may be of any standard design compatible with chosen word lengths and desired operating speeds. The output product signals from multiplier 110 appearing on lead 111 are then applied to fast Fourier transform processor 112.

The particular form for the FFT processor 112 is in no way critical for purposes of the present invention. Thus any of the FFT configurations described in the paper by G. D. Bergland "Fast Fourier Transform Hardware Implementations," *IEEE Transactions on Audio and Electroacoustics*, Vol. AU-17, June 1969, pp. 104–108 may prove convenient in particular instances. Further, the particular configurations described in U.S. Pats. No. 3,544,775 issued DEC. 1, 1970 to G. D. Bergland et al; No. 3,588,460 issued June 28, 1971 to R. A. Smith; and No. 3,517,173 issued June 23, 1970 to M. J. Gilmartin et al, are suitable for performing the required Fourier transformation. Since the output on lead 113 corresponds directly to the samples put in on lead 107 from memory 106, it is convenient to add a buffer memory on the output with a capacity sufficient for storing the N output coefficients. For each set of N input sample signals there are generated a sequence of N transformed coefficients. With a buffer memory attached at the output lead 113, it is possible to read the coefficients on the output in whatever order is desired. For fixed values of $k$, then, certain of the N samples formed at the output on lead 113 are selected to derive the useful information desired. In particular, not all of the coefficients generated at the output of the Fourier transform apparatus are used. Instead, a selection is made among the N results for each of the values of $u = 0, 2b, 4b$, etc. All of the useful information in the original multiplexed channels is derived from the sets of selected values of the N coefficients derived on the output for the designated values of $u$. That is, by virtue of the shaping filter and the redundancy, it is possible to extract all of the useful information using the above-described techniques.

The circuit of FIG. 1C may be used to actually physically perform the separation of the results of the FFT processing by repetitively selecting results from output buffer memory 250 under the control of a standard memory access circuit 260 and distributing them by way of switch 270 to respective channel leads 280–0 through 280–(L–1).

The output on lead 113 is a sequence of sequences of N Fourier series coefficients. That is, for a given value of $u$ and $k$, Equation (15) is computed by performing the indicated multiplications and summation. Then $k$ is incremented and the process is repeated for a total of N output values corresponding to the values $u = 0,1,...,N-1$ for each such fixed value of $k$. For a selected fixed $u$, as $k$ varies, a sequence corresponding to the original signal content of the channel associated with that value of $u$ is obtained. Processing of this kind causes a sequence of values to appear on output lead 113 for each of the original channels.

The output may be thought of as appearing in the order $$S(0,0), S(0,1), \ldots, S(0, N-1);$$
$$S(k',0), S(k',1), \ldots, S(k', N-1);$$
$$S(2k',0), S(2k',1), \ldots, S(2-k', N-1);$$

For purposes of retrieving the separated information in the L channels, we are interested in selecting the sequences $S(0, 0), S(k', 0), S(2k', 0), \ldots$ → channel 0

$S(0, 2b), S(k', 2b), S(2k', 2b), \ldots$ → channel 1

$S(0, 4b), S(k', 4b), S(2k', 4b), \ldots$ → channel 2

·
·
·

$S(0, (L-1)\,2b), S(k', (L-1)\,2b),$
$S(2k', (L-1)\,2b), \ldots$ → channel $L$

Any convenient method may be used for physically separating the desired output sequences, in time or in space, e.g., by a commutating switch.

The values of $u$ are conveniently chosen to be integers if fast Fourier processing is to be used to perform the required Fourier transform. These may be chosen from the range $u = 0,1,...,N-1$ since the discrete transform is periodic in $u$ with period N. The values of $k$ may be arbitrary integers, but for convenience the values $k = 0, k', 2k', 3k', ...,$ will be assumed. $k'$ must be chosen small enough to provide an adequate sampling rate at the filter outputs ($k' = 1$ is always adequate but it is often possible and advantageous to select a larger value for $k'$).

For each value of $k'$ a new set of N input sample signals is effectively processed. Correspondingly, a complete set of N output coefficient signals appears at the output of the Fourier processor. As mentioned above, a subset of this set of N output coefficient signals is then selected, one for each desired original channel. $k'$ effectively selects the period over which a new set of samples is defined. As should be clear from the above and from the state of the art in general, $k'$ need not be equal to a whole multiple of N. That is, overlap of consecutive sets of N input sample signals is permitted, and in fact is desirable.

The buffer memory 106 is advantageously used when $k' < N$, as is usual, to save that portion of $F_{jk'}(l)$ which is obtained in $F_{(j+1)k'}(l)$. That is, whenever consecutive N-sample sequences $F_k(l)$ overlap, it proves convenient to merely update the contents of a buffer memory to include new, not previously processed samples. Thus, the apparatus shown in FIG. 1D may be used, where $M = (N+1)/k$. New (updating) information is entered from lead 291 into one of the $k'$-location memories 290–$i$, and this information, and that in M−1 associated memories 290–$i$, is read out to generate each N-sample record. Related buffering techniques are disclosed in U.S. Pat. application Ser. No. 211,882, now U.S. Pat. No. 3,731,284, by F. W. Thies, filed of even date herewith and assigned to the assignee of the instant invention.

Referring again to FIG. 2, it is noted that the frequency scale is in units of the reciprocal of the spacing between time samples. The original channels before multiplexing each have a positive-frequency bandwidth of $b/N$ on this frequency scale, and there are L such channels. The manner of selecting system parameters to achieve the desired demultiplexing will now be treated. In particular, it will be required that $2b$ be chosen to be an integer which divides into N without remainder. $k'$ is set at the value $N/2b$ of the quotient. $b$ is furthermore chosen large enough to make the filters of the filter bank have a sufficiently narrow transition region from the passband to the stopband. (On the frequency scale of FIG. 2, this transition region cannot be less than roughly 1/N.) To prevent aliasing, N must be chosen to satisfy $(2L+1)b < N/2$. A real-valued $H(l)$ is chosen to give a $W(-v)$ which is suitable for separating channel 0 from the other channels. The required input sampling rate S (in Hertz) for switch 102 in FIG. 1 may be found from $$S = BN/b, \qquad (19)$$

where B is the positive-frequency bandwidth (in Hertz) of an original channel before multiplexing. The real value for $H(l)$ implies a symmetrical frequency function which permits the desired separation about 0 frequency to be derived. Correspondingly, of course, each of the L channels derives a substantially identical result when this real value filter is applied. It will be seen below, however, that for single sideband input signals a real valued $H(l)$ is undesirable.

It is clear that the relevant values of $u$ are $u = 0, 2b, 4b, \ldots$, as these are the normalized frequencies centered on the multiplexed channels.

Before treating examples of particular time windows for use in the system of FIG. 1, it is worth noting how the desired channel separation may be effected in the frequency domain using appropriate frequency windows. Thus consider forming $$S_o(k,u) = \sum_{l=0}^{N-1} F(l+k-N+1)e^{-i2\Pi ul/N}. \qquad (20)$$

Then $$S(k,u) = N^{-1} \sum_{j=0}^{N-1} S_o(k,j)W(u-j). \qquad (21)$$

Note that W is the frequency window corresponding to the time window $H(l)$. To obtain the filter outputs $\{S(k,m)\}_{m=0}^{N-1}$ of the form appearing on lead 113 in FIG. 1 in the frequency domain, one omits the multiplication by the time window and includes instead a convolution operation after performing the DFT of $F_k(l)$. This convolution modifies all of the "unwindowed" filter outputs to yield the "windowed" values $S(k,m)$ according to the formula $$S(k,m) = N^{-1} \sum_{j=0}^{N-1} S_o(k,j)W(m-j) \qquad (M = 0, 1, \ldots, N-1). \qquad (22)$$

Clearly, much more digital computation will be involved in applying the window in the frequency domain than in applying it in the time domain unless $W(m) = 0$ for nearly all $m = 0, 1, \ldots, N-1$, or unless nearly all the nonzero values of W are powers of the number system radix.

A circuit for performing these alternate channel separation techniques is shown in FIG. 1A. Input lead 210 is arranged to receive the input sequence $S_o(k,u)$ which is obtained by merely Fourier transforming the sequence $F_k(l)$ using only FFT processor 112 in FIG. 1. This is equivalent to setting $H(l) = 1$ for all $l$. The frequency window function values $W(l)$ are then read from read-only memory 211 and supplied on lead 212 to convolution circuit 213. Convolution circuit 213 then forms the products indicated in Eq. (22). The circuit configuration for convolution circuit 213 may assume any well-known form, including a programmed digital computer or more specialized apparatus. In particular, one of the so-called "fast convolution" techniques described in Helms, "Fast Fourier Transform Method of Computing Difference Equations and Simulating Filters," *IEEE Trans. on Audio and Electroacoustics*, Vol. AU–15, June 1967, pp. 85–90; Stockham, "High-Speed Convolution and Correlation," *Proc. AFIPS* 1966 *Spring Joint Computer Conf.*, Vol. 28, Washington, D.C., Spartan, 1966, pp. 229–233 may be used.

FIG. 1B shows a typical configuration for realizing the circuitry of FIG. 1A for the special case where $u$ is an integer, i.e., for the case where $u = 0, 1, 2, \ldots, N-1$. Thus, there is shown in FIG. 1B and N stage shift register identified as 220. Initially, shift register 220 is arranged to store the sequence of values $S_0(k,m)$. These values are advantageously transferred in parallel to shift register 220. Each of the output values for the sequence $S_0$ stored in shift register 220 is individually applied to a corresponding one of multipliers 230–$i$ as shown in FIG. 1B. Multipliers 230 are employed to perform the multiplications required in effecting the convolution required for performing the frequency processing of the output signals in the frequency domain. Thus, the additional input to multipliers 230–$i$ are the corresponding values of W. Because of the inverse time relationship involved in performing a convolution, however, the values supplied to respective multipliers 230–$i$ in FIG. 1B are the values of the W function for negative values of the argument. Thus, the first multiplier 230–0 is supplied with the value W(0), the second multiplier 230–1 is supplied with the value W(−1), etc. It should also be noted that the relationship $W(m) = W(N+m)$ applies, i.e., the W function is periodic with period N.

Multipliers **230–*i* are then for any given instant used to form the product of the corresponding value of W with the value of $S_0$ stored in the stage of shift register 220. The outputs from each of the multipliers 230–*i* are advantageously combined in adder 240. The output on lead 245** therefore is a value of S for a given value of *u*. In the next sample interval the contents of shift register 220 are shifted one sample to the left with the contents previously occupying the first position (at the left) of shift register 220 being entered into the rightmost position in shift register 220. The multipliers remain constant, however, for each step of the convolution processing. The multiplications are then repeated for each position of the data in shift register 220. After the contents of shift register 220 have been completely rotated, i.e., the original content of the stage N−1 having been processed after being stored in shift register stage 0, the process is complete for a given set of N output signals. At this time a new sequence of N inputs are stored in shift register 220 after having been derived by processing in the FFT processor 112 shown in FIG. 1.

It should be understood, of course, that although shift register 220 is shown as a single shift register, it advantageously comprises the total of *n* parallel shift registers each of N bits when a *n* digit word is used to represent the results of the processing by FFT processor 112. Similarly, the multipliers **230–*i*** are arranged to receive the number of digits supplied by shift register (*s*) 220 and a value of W with appropriate significance.

Some particular time windows that prove useful for some applications will now be considered. In particular, it will be shown that the sequences $$\{(\sin \pi l/N)^{2M}\}_{l=0}^{N-1}$$

(where M is a nonnegative integer considerably smaller than N) serve well as weight sequences for DFT spectrum analysis. The functions $P_M$, which are defined by $$P_M(t)\ (\sin \pi t/N)^{2M},\ 0 \le t \le N$$

$$0, \qquad \text{otherwise}$$

have *integral Fourier transforms* (IFT's) which, asymptotically as the frequency becomes large, roll off at 20(2M+1) dB/decade of frequency. Because of this rapid roll-off, the frequency windows $W_M$ corresponding to these weight sequences are nearly equal (in the "baseband" region) to the IFT's of the $P_M$ (this follows from the well-known aliasing relations). Moreover, there are only 2M+1 nonzero values $W_M(m)$ ($m=0,1,\ldots,N-1$) and these nonzero values are integer multiples of negative powers of two. Furthermore, the IFT of a $P_M$ rolls off as fast asymptotically as that of any other nonzero window function which is a cosine polynomial of degree not exceeding M. The frequency windows $W_M$ also have the very desirable property of having for $|u| < N/2$ a single principal maximum (in absolute value), located at zero frequency. Since the frequency response $R_M$ of a corresponding "analyzing filter" inherits all the nice properties of $W_M$ (see Eq. (18)), a sequence $\{P_M(l)\}_{l=0}^{N-1}$ is thus a particularly desirable choice for a time window.

The following facts pertaining to these windows are given without proof.

(i) $$P_M(t) = N^{-1} \sum_{m=-M}^{M} W_M(m) e^{i2\Pi mt/N};$$

(ii) $$N^{-1} W_M(m) = \frac{(-1)^m}{2^{2M}} \frac{(2M)!}{(M+m)!\,(M-m)!}$$

$$(m = 0, \pm 1, \pm 2, \ldots, \pm M);$$

(iii). $|W_M(1)/W_M(0)| = M/(M+1)$.

(iv). $|W_M(M)/W_M(0)| = (M!)^2/(2M)!$ (v) $$N^{-1} W_{M+1}(m) = \sum_{l=0}^{N-1} N^{-1} W_M(l) N^{-1} W_1(m-l)$$

$$(M = 1, 2, \ldots, [N/2] - 1).$$

[*z*] indicates largest integer less than or equal to *z*.

(vi). $W_M(m) = W_M(-m)$ ($m = 0, 1, \ldots, N-1$).

(vii)

| *m* | 0 | 1 | 2 | 3 |
|---|---|---|---|---|
| $N^{-1}W_0(m)$ | 1 | | | |
| $N^{-1}W_1(m)$ | ½ | −(¼) | | |
| $N^{-1}W_2(m)$ | ⅜ | −(¼) | −1/16 | |
| $N^{-1}W_3(m)$ | 5/16 | −15/64 | 3/32 | −1/64 |

Note that $P_M$ is the well-known Hanning window raised to the $M^{th}$ power and shifted by N/2 to the right (the shift to the right is wheat causes the alternation in the sign of the coefficients $W_M(m)$).

Table 1 summarizes the formulas and parameters for a number of windows based on the above-mentioned $P_M(l)$ and $W_M(m)$ windows. Included in Table 1 are the asymptotic roll-off rate in dB/decade and the very useful height-to-area ratio at zero frequency. The height-to-area ratio is, of course, the reciprocal of the well-known "equivalent noise bandwidth".

TABLE 1

| *m* | −2 | −1 | 0 | 1 | 2 |
|---|---|---|---|---|---|
| $W_a(m)$ | 0 | 0 | 1 | 0 | 0 |
| $W_b(m)$ | 0 | −½ | 1 | −½ | 0 |
| $W_c(m)$ | ¼ | −1 | 3/2 | −1 | ¼ |
| $W_d(m)$ | 0 | −½+*i*(½) | 1 | −½−*i*(½) | 0 |
| $W_e(m)$ | −*i*(¼) | −½+*i*(½) | 1 | −½−*i*(½) | *i*(¼) |
| $W_f(m)$ | ¼ −*i*(½) | −1+*i* | 3/2 | −1−*i* | ¼+*i*(½) |

| *m* | Formula | Roll Off | Ratio |
|---|---|---|---|
| $W_a(m)$ | $N^{-1}W_0(m)$ | 20 | 1 |
| $W_b(m)$ | $2N^{-1}W_1(m)$ | 60 | ⅔ |
| $W_c(m)$ | $4N^{-1}W_2(m)$ | 100 | 18/35 |
| $W_d(m)$ | $2N^{-1}[W_1(m)+imW_1(m)]$ | 40 | ½ |
| $W_e(m)$ | $2N^{-1}[W_1(m)+imW_2(m)]$ | 60 | 8/17 |
| $W_f(m)$ | $4N^{-1}[W_2(m)+imW_2(m)]$ | 80 | 18/55 |

Demodulation

From the above, it is clear how the desired channel separation of a plurality of double-sideband chennels may be effected. It remains to be demonstrated, however, that a simultaneous demodulation of each of the separated channels may be accomplished in a simple manner. As will appear, a particular choice of *k'* permits the desired demodulation to be effected.

The filter outputs are being sampled at the rate 2*b*/N, which divides without remainder into the filter center frequencies, creating the proper images to represent the demodulated channel. Consider the effect of the system on a typical input wave of the form exp- $[i2\pi(w+2jb)t/N]$ where $|w| < b$ and where $j$ is an integer. This wave is then a typical component of the $j$th channel. The output corresponding to this channel is $$S(k'l,2jb) = \exp[i2\pi(w+2jb)k'l/N]\cdot R(w+2jb)$$

for $l=0,1,2,\ldots$ . Now $$R(w+2jb) = \exp[i2\pi(2jb)(1-N)/N]\cdot W(-w)\cdot\exp[i2\pi w(1-N)/N]$$
$$= \exp[i2\pi j/k']\cdot W(-w)\ \exp[i2\pi w(1-N)/N]$$

and $$\exp[i2\pi(w+2jb)k'l/N] = \exp(i2\pi wk'l/N)$$
$$= \exp(i2\pi wt/N)\,|_{t=k'l}$$

Therefore the output of the filter centered at $2jb$ is the input wave sampled at $0,k',2k'\ldots$ and multiplied by the two quantites $$\exp(i2\pi j/k'),\ \tilde{W}(w) = W(-w)\exp[i2\pi w(1-N)/N].$$

The first of these is a constant of absolute value unity which depends only on the channel number, while the second of these is a frequency-dependent factor having the property $$\tilde{W}(w) = \tilde{W}^*(-w),$$

(here * denotes complex conjugate) due to the fact that $H(l)$ is real-valued. The output of any filter will therefore be the channel-separated and demodulated original input channel except for the slight effect of amplitude and phase distortion due to $\tilde{W}(w)$ and except for a known complex factor of unit absolute value. The manner in which the baseband signals are derived is thus seen to amount to a proper selection of the value for $k'$. Thus, by choosing $k'$ in the manner indicated above, the effect of sampling each of the L output channels at the effectively correct rate is achieved. To summarize, then, it is clear that by choosing the parameters $b$, N, and $k'$ to satisfy the relationship $k' = N/2b$ the required channel separation and simultaneous demodulation occurs without any further analysis being required. If one observes the sequence corresponding to a particular channel over a period of time, then what is observed is a sequence of baseband sample signals corresponding to the original unmodulated signal appearing in the channel of the broadband signal. That is, the values chosen have not only separated the channels from one another, but have simultaneously demodulated the signals appearing in each channel to derive the corresponding baseband signals.

Because $\tilde{W}(w)$ is complex-conjugate symmetric, apart from the complex factor $\exp(i2\pi j/k')$, a real channel input gives a real channel output, although the output channel may be slightly changed in the amplitude and phase of its frequency components. The complex factor may be dealt with by taking either the real or imaginary part of a filter output. The real part would be taken if $|\cos 2\pi j/k'| \geq |\sin 2\pi j/k'|$ and otherwise the imaginary part would be taken. The channel gains are then equalized by inserting selected attenuators. The maximum attenuation needed is 3 dB, since the minimum of the greater of $|\cos\theta|$ and $|\sin\theta|$ is $1/\sqrt{2}$.

Two inputs may be simultaneously processed by using the symmetry techniques described above (see Eqs. (8 and 9)). Also, as indicated above, the weighting function $H(l)$ may be applied by frequency convolution (instead of time multiplication) according to Eq. (22). A technique for performing the required Fourier processing using a transform of length $k'$ instead of length N has been given by Cooley, et al, "The Finite Fourier Transform," *IEEE Trans. on Audio and Electroacoustics*, Vol. AU–17, June 1969, pp. 77–85, at p. 84, and this is very advantageous in many cases. However, this last-mentioned technique requires that $H(l)$ be applied in the time domain and requires some additional processing prior to the FFT processing.

Single-Sideband Demultiplexer

Figure 4:
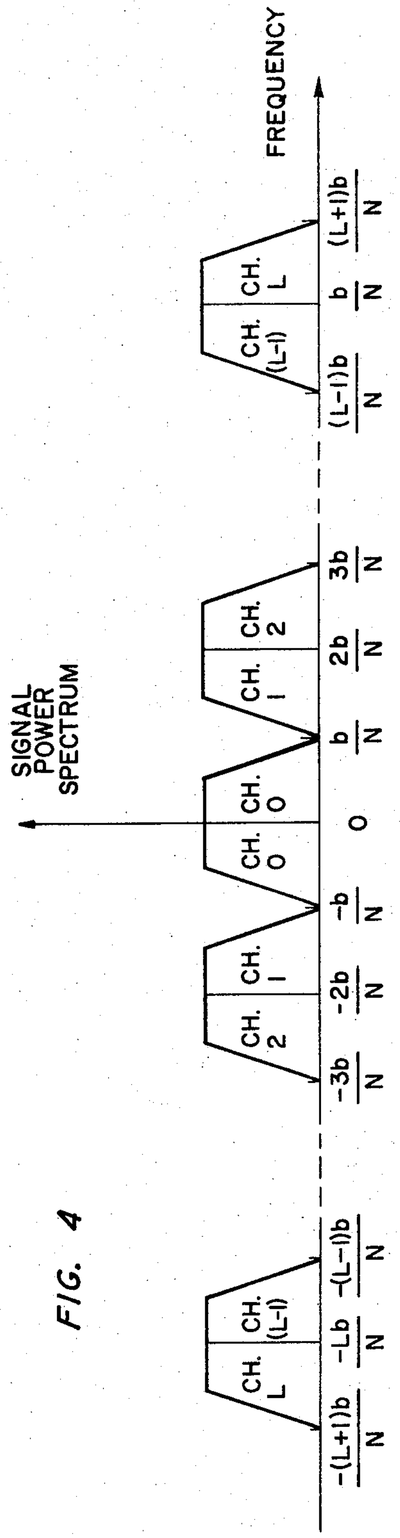
FIG. 4 illustrates a typical frequency content for single sideband signals appearing as an input to the system of FIG. 1.
Figures 1D, 3:
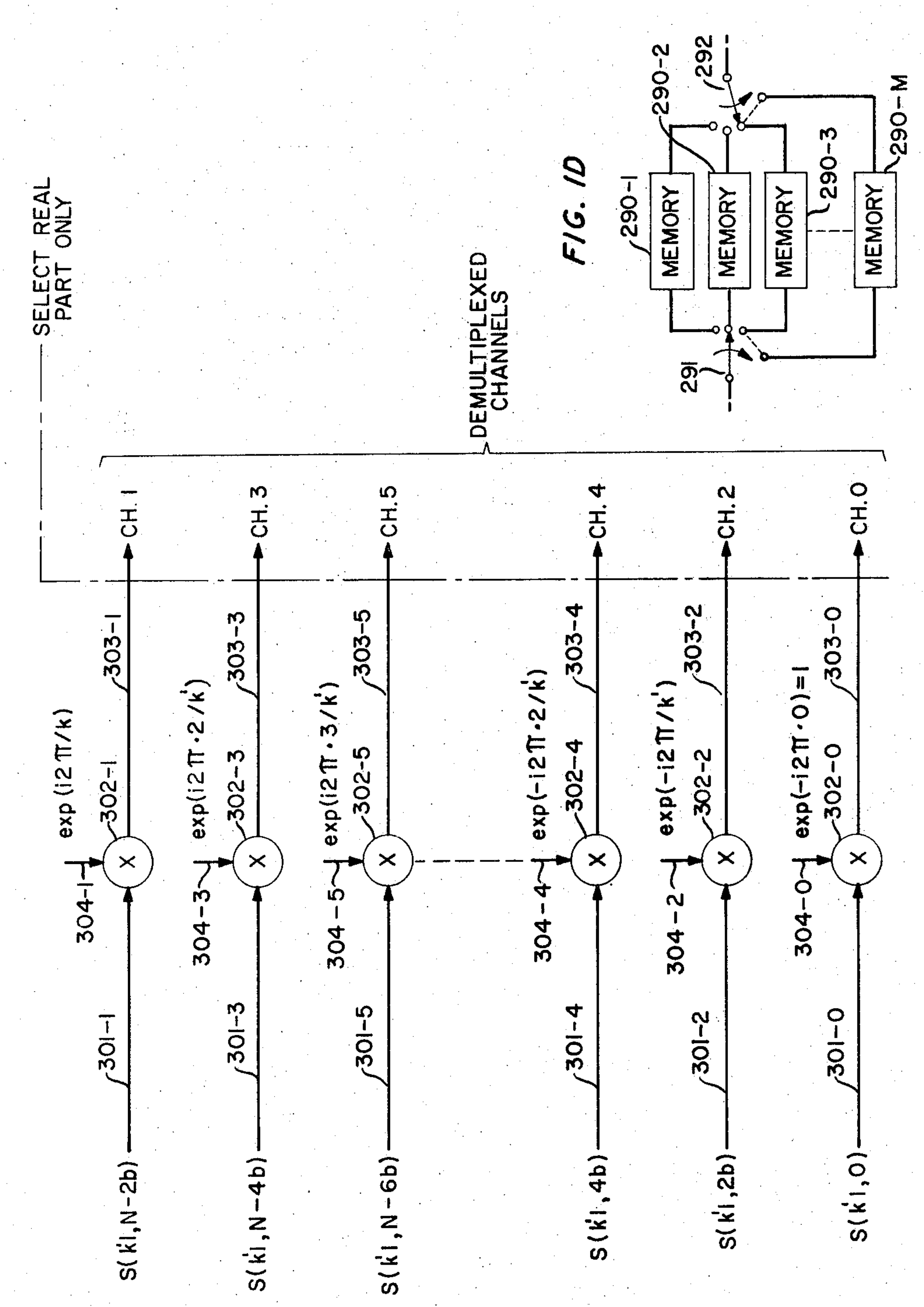
FIG. 1D illustrates a useful input buffering arrangement for the system of FIG. 1.
FIG. 3 shows a postprocessor for use with the system of FIG. 1 when it is desired that single sideband signals of the type shown in FIG. 4 be processed.

The filter bank of FIG. 1, followed by the processor of FIG. 3, may be used to demodulate the specially-configured single-sideband channels illustrated in FIG. 4 in a manner which is very similar to that used to demodulate the channels of FIG. 2. The + and − superscripts denote, respectively, the upper and lower sidebands of the channels in FIG. 4. Notice the alternation between upper and lower sidebands. This is important because alternation is an essential requirement for preserving the sense of the frequency axis of the demodulated sidebands.

The filter bank is designed in the same way as for the double sideband case with two exceptions. N now must satisfy $(L-1)\,b < N/2$ and $H(l)$ (which will of necessity be complex-valued) is chosen to give a $W(-v)$ which separates the upper sideband of channel 0 from the remainder of the spectrum.

The demodulated upper sidebands of the channels are related to the value of $u$ as shown in Table 2 below.

TABLE 2

| Channel No. | u |
|---|---|
| 0 | 0 |
| 2 | $2b$ |
| 4 | $4b$ |
| . | . |
| . | . |
| . | . |
| 5 | $N - 6b$ |
| 3 | $N - 4b$ |
| 1 | $N - 2b$ |

Since the complex factor of unit absolute value which occurs in the frequency response of the filter with $u = 2jb$ may cause severe phase distortion if not removed, the post-processor of FIG. 3 is used. It simply multiplies the respective filter outputs by the reciprocal of the undesired complex factor. The real part of the result is then selected to effect the construction of the sum of lower and upper sidebands for each channel. (The lower sideband is the complex conjugate of the upper sideband.) This sum is the original channel apart from an amplification factor and the slight effect of $\tilde{W}(w)$. Since, for the processor of FIG. 3, only the real part of a multiplier output is required, the multiplier may be constructed to only perform the two real multiplications and one real addition needed to produce the real part of the result.

The reason that the real component of the output from the multipliers in FIG. 3 is selected is that it is desired to reconstruct the original two-sided frequency spectrum based on the processed single sideband component. In particular, by taking the real part (that corresponding to the cosine component of the complex number and recognizing the relationship that $2\cos\theta t = 2Re[e^{i\theta t}]$, which is two times the value of the real part of the complex signal appearing on the output of the respective leads from the multipliers in FIG. 3. It was assumed, of course, in the foregoing that the original input samples were real-valued signals so that the symmetry related to the conjugate relationship between the signals in the lower sideband to those in the upper sideband exists.

The simultaneous processing of two inputs as outlined above is not, in general, possible for single sideband input sample signals, since $H(l)$ is complex-valued. The weighting function again may be applied in the frequency domain, however, as indicated above for double-sideband signals. Also, the technique for performing less than an N-point transform described above may be applied again here.

The single-sideband demultiplexer may also be used as a bandshift modulator, although alternate bands will be frequency-reversed at the output. By "bandshift modulator" is meant a processor which selects a frequency band and relocates it in frequency so that its upper or lower bandlimit relocates to zero frequency. It is possible to right the reversed output channels by complex modulation (i.e., multiplication by $\exp(i2\pi bt/N)$) of the inputs to the processor of FIG. 3 which correspond to reversed output channels. This same technique may also be applied when single-sideband channels which do not alternate sidebands in the manner of FIG. 4 are to be demodulated.

It will prove helpful to consider an example illustrating the above-described single-sideband processing. Thus, suppose that $L = 12$ single-sideband channels each of bandwidth 4kHz, alternating as in FIG 4, are to be demodulated. Assume that $b = 32$ is adequate to achieve the required transition region. Then choosing $N = 1024$ will satisfy the requirement $(L+1)b < N/2$. The input sampling rate will then be $S = BN/b = 128$kHz. If the Cooley, et al technique for reducing the size of the transform required (see "The Finite Fourier Transform," *IEEE Trans Audio and Electroacoustics*, Vol. Au–17, June, 1969, p. 84) is used then since $k' = N/2b = 16$, the processing may be accomplished using a 16–point fast Fourier processor. This processor processes the 16–point input records $\phi_k(l)$, $l=0,1,\ldots,15$, given by $$\varphi_k(l) = \sum_{j=0}^{2b-1} H(l+jk')F_k(l+jk')$$

to give $$S(k, 2jb) = \sum_{l=0}^{k'-1} \varphi_k(l)e^{-i2\pi lj/k'}.$$

An additional simple processor is, of course, needed to form $\phi_k(l)$ from $F_k(l)$ and $H(l)$.

Although the terms "wideband" and "broadband" have been used above to describe the original composite signal to be separated, it should be recognized that these signals may be "broad" or "wide" in frequency extent in only a relative sense in many cases. That is, they may in some cases, be relatively "narrow" in bandwidth by some standards, even though they may contain a large number of channels. Similarly, the number of channels L may be any of a large number of values.

While the above description has proceeded in terms of specific hardware units, it should be clear to those in the art that in appropriate circumstances any or all of the functions described above may be performed using a programmed general purpose (or special purpose) digital computer.

While the Fourier processing described above has been largely in terms of FFT processing, it will be understood that other equivalent DFT processing will suffice in many instances.

Numerous and varied modifications of the above described embodiments within the spirit and scope of the attached claims will occur to those skilled in the art.

What is claimed is:

1. Apparatus for separating an input composite signal including signals corresponding to L channels into its component channel signals comprising 1. means for multiplying sets of N ordered samples of said input composite signal by N corresponding weighting signals to form sets of sequences of N weighted samples, each of said sets of N weighted samples being generated during a period designated a record interval,
2. means for Fourier transforming each of said sets of N weighted signals to generate sets of N Fourier coefficients,
3. means for selecting from each set of N Fourier coefficients one coefficient associated with each of said channels, and
4. means for grouping those selected Fourier coefficients associated with the same one of said channels.

2. Apparatus according to claim 1 further comprising an input buffer to store said sets of N ordered samples of said input signal.

3. Apparatus according to claim 2 further comprising a plurality of output leads, an output buffer for storing the sets of Fourier coefficients generated by said means for Fourier transforming, and wherein said means for selecting comprises means for selecting one coefficient of each set of N Fourier coefficients stored in said output buffer, and said means for grouping comprises means for applying said selected coefficients to respective ones of said output leads to a corresponding one of said output leads.

4. Apparatus according to claim 1 wherein said means for Fourier transforming comprises means for performing a fast Fourier transform.

5. Apparatus according to claim 4 further comprising an input buffer wherein $k'$ is an integer which divides into N without remainder and successive ones of said sets of N samples includes the $N - k'$ most recent samples from the immediately preceding set of N samples and $k'$ samples received during a current record interval, and wherein said input buffer comprises means for storing $N+k'$ ordered samples, and means for sequentially reading out the $N/k'$ subsets of $k'$ samples corresponding to the respective $N/k'$ record intervals from said input buffer, while the subset of $k'$ samples corresponding to the most remote record interval is replaced in said input buffer by a set of $k'$ samples during a current record interval.

6. Apparatus according to claim 4 where $k' = N/2b$, where $b$ is the positive frequency bandwidth of each of the component channels.

7. Apparatus according to claim 5 wherein $k' > 2L + 1$.

8. Apparatus for separating an input composite signal into its component channel signals comprising 1. means for Fourier transforming sets of N samples of said input signal to generate corresponding sets of N Fourier coefficients, and 2. means for convolving each of said sets of N Fourier coefficients with a corresponding set of weighting signals.

9. Apparatus for simultaneously separating and demodulating each of a plurality of single-sideband channel signals originally appearing as a single relatively broadband composite signal comprising 1. sampling means for sampling said composite signal to generate sets of N signals during each fixed time period,
2. means for selectively weighting said sets of N signals, thereby forming corresponding sets of N weighted signals,
3. means for Fourier transforming said sets of weighted signals to generate corresponding sets of N Fourier coefficients,
4. means for selectively multiplying the coefficients of said sets of Fourier coefficients by a corresponding phase shifting factor to generate sets of phase-shifted Fourier coefficients, and
5. means for selecting the real part of the value of said phase-shifted Fourier coefficients.

* * * * *